United States Patent [19]

Lavoie

[11] Patent Number: 5,195,783
[45] Date of Patent: Mar. 23, 1993

[54] IDENTIFICATION DEVICES

[76] Inventor: Matthew J. Lavoie, 225 Rte. 16B, Somersworth, N.H. 03878

[21] Appl. No.: 836,732

[22] Filed: Feb. 19, 1992

[51] Int. Cl.$^5$ ............................................. B42D 15/00
[52] U.S. Cl. ..................................... 283/75; 283/901; 40/636
[58] Field of Search ....................... 283/74, 75, 80, 98, 283/99, 81, 117, 900, 905; 40/294, 630, 633, 634, 640

[56] References Cited

U.S. PATENT DOCUMENTS

| | | | |
|---|---|---|---|
| 2,975,091 | 3/1961 | Tobey | 40/630 X |
| 3,513,575 | 5/1970 | Schiller | 40/640 |
| 4,254,566 | 3/1981 | Haskell | 40/636 |
| 4,408,406 | 10/1983 | Banton | 40/640 X |
| 4,733,439 | 3/1988 | Gentry | 40/636 X |
| 4,958,459 | 9/1990 | Davidson | 40/636 |
| 4,991,337 | 2/1991 | Solon | 40/633 |

Primary Examiner—Mark Rosenbaum
Assistant Examiner—Willmon Fridie
Attorney, Agent, or Firm—William G. Rhines

[57] ABSTRACT

This disclosure relates to the field of identification devices. Embodiments include a shoelace, near the center of which is affixed a flexible strip, made from textile, plastic, or other suitable material, that is adapted to be wrapped about the shoelace and retained in that position. Desired information, such as name, address, telephone number, blood type, medical facts of special concern, or the like, may appear on the surface of the strip which is to be concealed by the strip having been overlaid by itself as it is wrapped about the shoelace. The strip, so marked and so positioned, may be surrounded by a protective cover material, such as a short, tubular segment of clear plastic, to protect the strip while keeping the distinguishing indicia visible. Such protective cover and/or the surface of the strip which is exposed when the strip is so wrapped may include distinguishing indicia to notify interested persons, such as police, medical workers, etc., of the existence of the enclosed information. Thereby, the identification of a lost child, or information relevant to treating a person in medical emergency may be identified as being available and made easily accessible when needed, while being concealed until then.

20 Claims, 1 Drawing Sheet

IDENTIFICATION DEVICES

BACKGROUND OF INVENTION

Frequently, it is desired to equip a person with information by means of which that person's identity, or facts relevant to that person's physical condition, may be readily and clearly available in the event of unusual occurrences. Thus, an infant or other child who is lost, or an older person who is handicapped by a disease or disability or other medical condition, may not be able to communicate who they are, where they live, their telephone number or other identification information. Additionally or alternatively, a person may have a condition that medical, emergency or other personnel need to know about in order to render services that may be required. Thus, a person who has a heart attack, or has fainted, or is in diabetic shock, may be rendered temporarily incapable of communicating such information. Similarly, a person may have a medical history or blood type that is difficult to communicate accurately or that they are unable to remember or communicate.

Various attempts have been made to address these problems. For example, notes or other written records may be placed in a person's pocket or pocket book or wallet. However, they tend to become lost or so disfigured as to be illegible. Also, they are easily overlooked, particularly by a potential rescuer who may be reluctant to search the clothing or effects of a child or invalid or incapacitated person. Labels sewn in the clothing have also been used, but these tend to become disfigured or otherwise illegible through use and cleaning. Further, recovery of them can involve invading the person's private apparel to such an extent as to discourage others from conducting a search that will lead to discovery of the information, particularly where there is doubt as to what actually is happening.

In addition, there is the consideration of not wanting some or all of such information to be available to others except where a situation has actually arisen that requires it to be disclosed. Thus, a persons medical facts or condition, or their identity if a child, are examples of information it is not desirable to disclose to casual observers or potential wrongdoers. To that end, concealment of the information may be desirable, but should be accompanied by sufficient notice that is readily discernible, to ensure that the information is available when and if needed.

Prior art attempts to satisfy these requirements have not been successful to the degree of the present invention. For example, U.S. Pat. No. 4,858,957 discloses an identification tag for insertion inside the user's shoe. However, such devices are subject to derogation over the long term as one wears the shoe and it is exposed to moisture, weather and the like, and the presence of the information, should its use be required, is not readily apparent.

Accordingly, it is an object of this invention to provide means for recording desired information to be carried on the person of the user.

Another object of this invention is to provide such means in a manner that is readily and easily able to be incorporated into the wearing apparel of the user.

Still another object of this invention is to provide means which satisfies one or more of the foregoing objectives and is adaptable to being relocated from one piece of the user's apparel to another.

Yet another object of this invention is to provide means which satisfies one or more of the foregoing objectives and is adaptable to carry a wide variety of information.

Still another object of this invention is to provide means which satisfies one or more of the foregoing objectives and is substantially protected against derogation from use and/or exposure.

Another object of this invention is to provide means which satisfies one or more of the foregoing objectives and, while concealing the included information, provides an indication that the information is available and accessible when need arises.

Yet another object of this invention is to provide mean which satisfies one or more of the foregoing objectives and is inexpensive to produce, versatile in application, and compatible with other elements of attire.

Another object of this invention is to provide means which satisfies one or more of the foregoing objectives and is unlikely not to be included among the wearing apparel of the user.

STATEMENT OF INVENTION

Desired objects may be achieved through practice of this invention, embodiments of which include a flexible strip of material, adapted for being retentivity wrapped about elongated items of wearing apparel, and to bear information of desired content on surfaces thereof which will be concealed when it is wrapped about such wearing apparel. An outer element may be included whereby the indicia bearer is protected against deterioration and defacement. Whether by such outer element or by the surface of the indicia bearer which is exposed to view after it has been so wrapped about such wearing apparel, indicia is displayed from which the viewer is led to conclude that information is available within.

DESCRIPTION OF DRAWINGS

This invention may be understood from the accompanying claims and specification, and drawings in which

DESCRIPTION OF PREFERRED EMBODIMENTS

Figure 1:
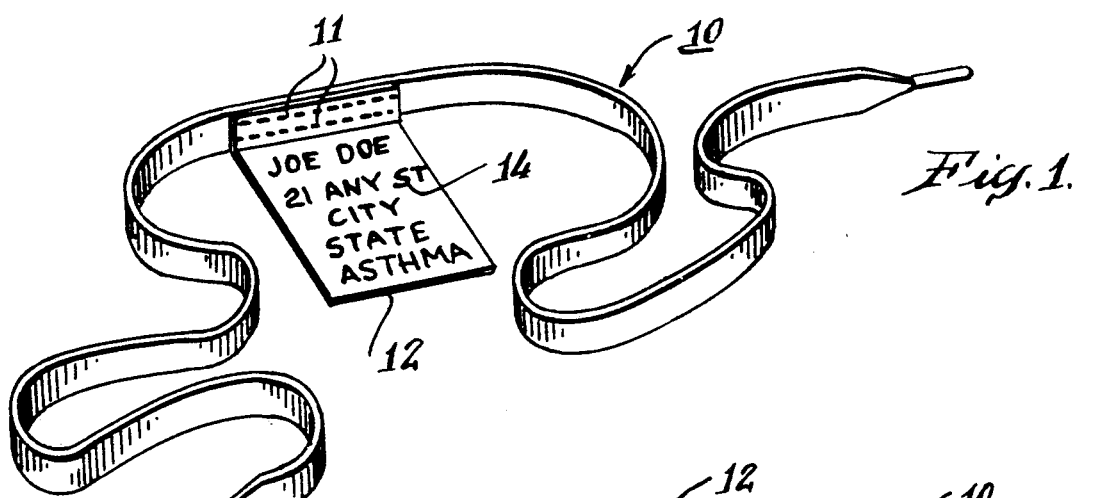
FIG. 1 is a perspective view of an embodiment of this invention.

Referring first to FIG. 1, there is depicted a shoelace 10 to which has been affixed by stitching 11 one end of an indicia indicator 12 in the form of a strip of material. Although affixation by sewing is shown, it is within the contemplation of this invention that other affixation means, such as adhesive, thermal bonding, or other known per se means, may be used, or that retention may be by means other than affixation, as hereinafter elaborated. The indicia indicator 12 may be made from textile, plastic or other material suitable for the intended use according to known per se criteria. When it is affixed to its associated article of clothing, it is within the contemplation of this invention that the indicia indicator may be affixed at locations other than one end, such as near or at the middle, depending upon the intended use. Particularly with the foregoing characteristics, it will be apparent that the indicia indicator being described is thereby adapted to be wrapped about the shoelace 10. It should be apparent that although the embodiment being described involves a shoelace, it is within the contemplation of this invention that embodiments of it might be associated with other items of wearing apparel, such as bracelets, necklaces, hair barrettes, belts, etc. Thus, in this context, the term "wearing apparel" is to be construed in its broadest sense as meaning anything worn on the body, whether of a person or a pet, even though as a form of clothing, footwear, headwear, or other items, such as decorations, ornaments and/or accessories.

Figure 2:
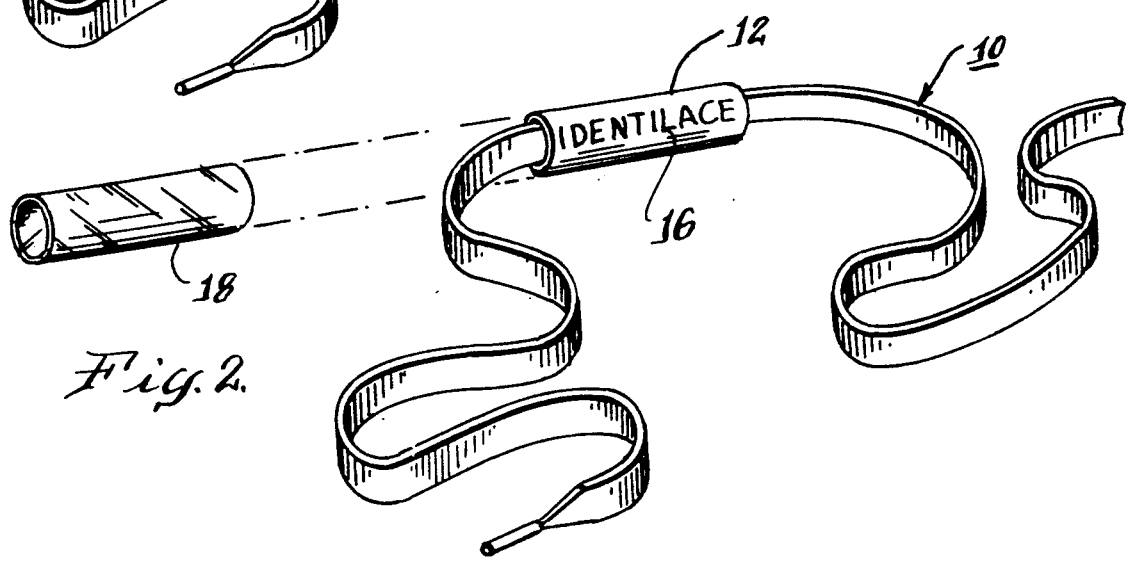
FIG. 2 is another perspective view of the embodiment of this invention shown in FIG. 1.
Figure 3:
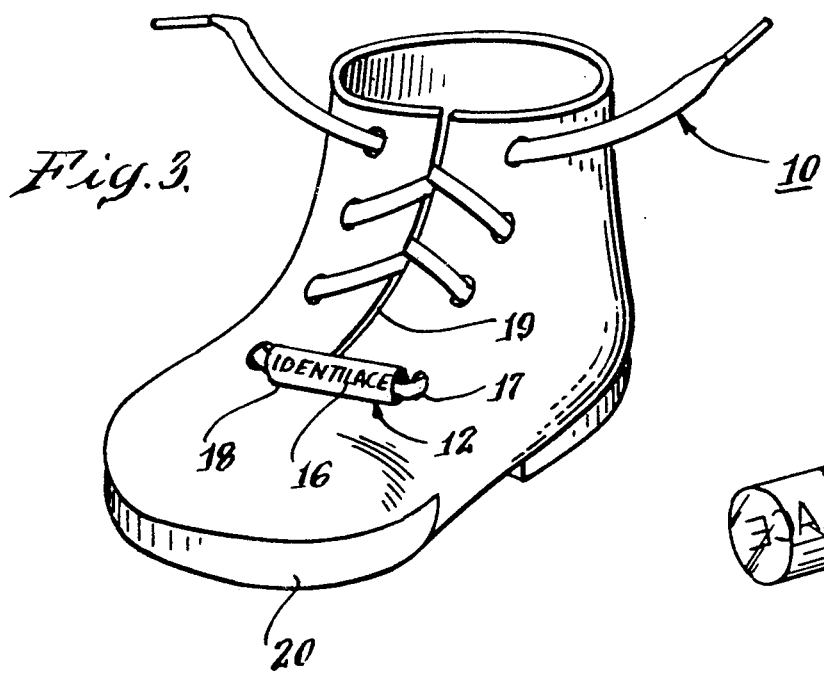
FIG. 3 illustrates the embodiment of this invention shown in FIGS. 1 and 2 in use.

By this means, one surface 14 of the indicator 12 may effectively be concealed from casual view by being positioned on the inside of the wraparound configuration, as shown in FIGS. 2 and 3. Thus, with an indicator in which that surface is provided with the desired information, as shown in FIG. 1-3, medical data, personal information, or other desired data may be so recorded and concealed until needed.

It is to be noted that although a relatively elongated strip is shown as the indicia indicator in these drawings, it is within the contemplation of this invention that it may be of other dimensions, such as twice the width of the shoelace, so that the portion of it not immediately juxtaposed to the shoelace may be placed as a single layer abutting the underside of the shoelace.

In configurations within the contemplation of this invention, data and other information may be effectively concealed from view until the strip is unfolded and the data-bearing surface intentionally exposed to view. However, in order to indicate that such data is available, an appropriate legend 16 may also be presented to view to lead one to the information that is available within. In FIGS. 2 and 3, such a legend is shown as appearing on a portion of the surface of the indicia indicator which will remain readily visible when the indicia indicator is in its final "wrapped around" configuration about its associated piece of wearing apparel. However, this legend could also, or in the alternative, be inscribed on other exposed constituents, such as a protective, tubular outer covering as hereinafter described. Thus, as illustrated in FIGS. 2 and 3, the word "IDENTILACE" is made to appear since this is the trademark by which this product is known, but other names or instructions (e.g., "Open In Case Of Emergency") may otherwise or also be used.

In order to protect the device in use, as is shown in FIG. 2, a cover 18 may also be included. Preferably, as shown, it is made from relatively durable, transparent material, such as the segment of plastic tube shown. An alternative or addition to such a legend being shown on what ends up being the exteriorly exposed surface of the indicia indicator, is to include one or more outwardly visible legends of a comparable nature (e.g., "IDENTILACE", "Open in Case of Emergency" etc.,), imprinted or engraved on the inside surface or outside surface of the cover if the cover 18 is transparent or on its outside surface if it is not. As such, the cover 18 is adaptable to being slid into place after indicia has been entered onto the indicator and it has been folded or wrapped into its desired normal use configuration. Conversely, it is easily removably when the occasion arises. Such covers 18 may be made of such length as to be retained in placed by other elements of the wearing apparel with which it is worn. Thus, such a cover may be of such length as to extend under, or abut the edges of, the flaps 14 or eyelets 17 of a shoe 20 on which the message bearing lace is located. Such a cover 18 ensures that the indicia indicator which it encases is protected during use. It also facilitates retention and removal of the device for use on other apparel (i.e., another pair of shoes), whether along with the lace or independant of it if the indicia indicator is not attached to it.

It should also be noted that such a cover 18 also serves the purpose of holding the indicia indicator retained in place, against becoming unwound, torn or frayed, or removed, while holding fully displayed the outer markings which inform the observer that information is contained within. These results may also, or in the alternative, be achieved by the use of other retention means. For example, a light, non-destructive temporary coat of adhesive may be used to hold the indicator in place, or the strip itself may include Velcro elements to effect removable retention. Of course, the free end of the strip could also or alternatively be retained by it being positioned behind the shoelace or other item of wearing apparel and held there by the tension on the shoelace causing it to bear upon the associated shoe.

Figure 4:
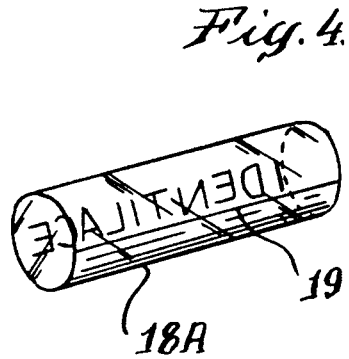
FIG. 4 is a perspective view of another embodiment of this invention.

FIG. 4 illustrates an alternative form of outer cover member 18A. Like that previously shown and discussed, it may be made of transparent or opaque material, and may be externally or internally inscribed. However, this embodiment includes a longitudinal slit 19 to enable the cover to be snapped into place about an indicia indicator already in place about the associated item of wearing apparel, without it having to be threaded on as hereinbefore described. The advantages of this arrangement include not having to remove the item of wearing apparel, such as the lace from a shoe, or a belt from trousers, in order to put the cover in place. It also facilitates installation on items which include obstructive elements, such as the buckle on a belt.

Having in mind the indicator retention capabilities of outer covers and/or retention means of the type hereinbefore discussed, it will be seen that although direct affixation of the indicia indicator to its associated item of wearing apparel may be desirable, it is within the contemplation of this invention that mere retention in place without actual physical joining may suffice. Thus, one might prepare an indicia indicator with desired information so positioned on it as to be concealed when the indicator is in place, and merely wrap it about its associated item of wearing apparel without physical connection Appropriate means may then be implemented to retain the indicia indicator in place, as by sliding a protective tube over it as described in connection with the embodiment shown in FIGS. 1-3, or snapping into place a cover of the type shown in FIG. 4. Like the physical attachment means noted above, such covers will then have the desired effect of retaining the indicia indicator in position about the item of apparel.

Thus, it is to be understood that the embodiments of this invention as herein shown and described are by way of illustration and not of limitation, and that a wide variety of embodiments may be made without departing from the the spirit or scope of this invention.

I claim:

1. An information device comprising
a flexible strip of material which has oppositely oriented outer surfaces and is adapted for
being retentively wrapped about an elongated article of wearing apparel, and
bearing information of desired content on one of said surfaces thereof which, when said strip is so wrapped, is concealed from view, means for displaying information of desired content that is exposed to view after said strip has been so wrapped, and means for retaining said strip wrapped around an article of wearing apparel.

2. The device described in claim 1 wherein said means for displaying information of desired content that is exposed to view after said strip has been so wrapped comprises a surface of said strip that is exposed to view.

3. The device described in claim 1 wherein said retaining means comprises a protective sleeve adapted to surround said strip after said strip has been so wrapped.

4. The device described in claim 2 wherein said retaining means comprises a transparent protective sleeve adapted to surround said strip after said strip has been so wrapped.

5. The device described in claim 3 wherein said retaining means includes said means for displaying information of desired content after said strip has been so wrapped.

6. The device described in claim 1 wherein said strip is adapted to be wrapped about a shoestring.

7. The device described in claim 2 wherein said strip is adapted to be wrapped about a shoestring.

8. The device described in claim 3 wherein said strip is adapted to be wrapped about a shoestring.

9. The device described in claim 4 wherein said strip is adapted to be wrapped about a shoestring.

10. The device described in claim 5 wherein said strip is adapted to be wrapped about a shoestring.

11. Information apparatus for use with an elongated article of wearing apparel comprising a flexible strip of material which is adapted for being affixed to and wrapped about said article of wearing apparel with one of its surfaces concealed from view and a portion, at least, of the opposite surface exposed to view, and is adapted to bear information of desired content on said concealed surface, means for exposing to view information of desired content when said strip is so wrapped, and retaining means for positionally retaining said strip when so wrapped.

12. The device described in claim 11 wherein said means for exposing to view information of desired content comprises said portion of said opposite surface of said strip.

13. The device described in claim 11 wherein said retaining means comprises a protective sleeve adapted to surround said strip after said strip has been so wrapped.

14. The device described in claim 12 wherein said retaining means comprises a transparent protective sleeve adapted to surround said strip after said strip has been so wrapped.

15. The device described in claim 13 wherein said sleeve includes said means for exposing to view information of desired content when said strip is so wrapped.

16. The device described in claim 11 affixed to an elongated article of wearing apparel.

17. The device described in claim 12 affixed to an elongated article of wearing apparel.

18. The device described in claim 13 affixed to an elongated article of wearing apparel.

19. The device described in claim 14 affixed to an elongated article of wearing apparel.

20. The device described in claim 15 affixed to an elongated article of wearing apparel.

* * * * *